US011072462B2

(12) United States Patent
Mayer et al.

(10) Patent No.: US 11,072,462 B2
(45) Date of Patent: Jul. 27, 2021

(54) PAN WITH INTEGRATED AIR GAP

(71) Applicant: The Vollrath Company, L.L.C., Sheboygan, WI (US)

(72) Inventors: Theresa Mayer, Sheboygan, WI (US); Kristin Blada, Howards Grove, WI (US); Maximilian James Casler, Kaleva, MI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 126 days.

(21) Appl. No.: 16/460,273

(22) Filed: Jul. 2, 2019

(65) Prior Publication Data

US 2021/0002027 A1 Jan. 7, 2021

(51) Int. Cl.
*A01K 29/00* (2006.01)
*B65D 21/02* (2006.01)
*B65D 1/34* (2006.01)
*A47J 37/01* (2006.01)

(52) U.S. Cl.
CPC .......... *B65D 21/0233* (2013.01); *A47J 37/01* (2013.01); *B65D 1/34* (2013.01)

(58) Field of Classification Search
CPC ........ B65D 21/0233; B65D 1/34; A47J 37/01; A47G 23/06
USPC .............. 206/503, 505, 515, 518, 519, 557; 220/573.1, 669
See application file for complete search history.

(56) References Cited

U.S. PATENT DOCUMENTS

| | | | |
|---|---|---|---|
| 3,233,812 A * | 2/1966 | Kennedy | B65D 1/34 229/406 |
| 4,967,908 A * | 11/1990 | Kessler | B65D 1/34 206/503 |
| 5,004,121 A | 4/1991 | Howe | |
| 5,094,706 A | 3/1992 | Howe | |
| 5,203,254 A | 4/1993 | Fletcher | |
| D418,017 S | 12/1999 | Henry | |
| D431,958 S | 10/2000 | Harris | |
| D553,905 S | 10/2007 | Orr, Jr. | |

(Continued)

FOREIGN PATENT DOCUMENTS

EP 1 625 816 A1 2/2006

OTHER PUBLICATIONS

New 2019 Smallwares Countertop Equipment Catalogue, Sheet Pans & Accessories, pp. 133-137, https://vollrath.com/Vollrath-Files/Price-Lists/New_2019_Smallwares_Countertop_Equipment_Catalog_Web.pdf, accessed Jun. 12, 2019.

(Continued)

*Primary Examiner* — James N Smalley
*Assistant Examiner* — Elizabeth J Volz
(74) *Attorney, Agent, or Firm* — Foley & Lardner LLP

(57) ABSTRACT

A pan includes a base, a sidewall, and a lip. The sidewall extends from and around a first periphery of the base. The base and the sidewall cooperatively define a cavity. The lip extends from and at least partially along a second periphery of an end of the sidewall opposite the base. The lip has a first portion and a second portion. The first portion of the lip is configured to engage a third portion of a second pan when the pan and the second pan are in a nested arrangement such that engagement between the first portion of the lip and the third portion of the second pan forms an air gap between the pan and the second pan when in the nested arrangement.

16 Claims, 5 Drawing Sheets

(56) References Cited

U.S. PATENT DOCUMENTS

| | | | |
|---|---|---|---|
| D581,203 S | 11/2008 | Simon et al. | |
| D588,396 S | 3/2009 | Millsap et al. | |
| D653,496 S | 2/2012 | Henry | |
| D655,130 S | 3/2012 | Sarnoff et al. | |
| D663,570 S | 7/2012 | Sarnoff et al. | |
| D677,514 S | 3/2013 | Sarnoff et al. | |
| D690,552 S | 10/2013 | Hundley | |
| D757,484 S | 5/2016 | Brown et al. | |
| 9,510,699 B1 * | 12/2016 | Miller | A47G 23/04 |
| D800,492 S | 10/2017 | Sarnoff et al. | |
| D809,848 S | 2/2018 | Mirchandani et al. | |
| D825,254 S | 8/2018 | Khubani | |
| D829,036 S | 9/2018 | Garcia Luna et al. | |
| D835,934 S | 12/2018 | Demers et al. | |
| 10,159,215 B2 * | 12/2018 | Petty | A01K 1/0114 |
| D839,657 S | 2/2019 | Patel | |
| D842,641 S | 3/2019 | Demers et al. | |
| D867,802 S | 11/2019 | Demers | |
| D896,564 S | 9/2020 | Kerr et al. | |
| D901,827 S | 11/2020 | Julian | |
| D904,184 S | 12/2020 | Bontrager et al. | |
| 2006/0049189 A1 | 3/2006 | Golden et al. | |
| 2007/0151976 A1 | 7/2007 | Millsap et al. | |
| 2013/0037430 A1 | 2/2013 | Sarnoff et al. | |
| 2015/0096668 A1 | 4/2015 | Anders et al. | |
| 2018/0146684 A1 | 5/2018 | Morgan et al. | |
| 2019/0159629 A1 | 5/2019 | Chen | |
| 2020/0237141 A1 | 7/2020 | Lewis et al. | |
| 2021/0002027 A1 | 1/2021 | Mayer et al. | |

OTHER PUBLICATIONS

Lakeshore Learning, Sensory Tubs—Set of 3, retrieved online, Jan. 22, 2021, https://www.lakeshorelearning.com/products/accessories/sensory-tubs-setof3/p/PP273.

Mrs. Anderson's Baking Big Sheet Pan, retrieved online, Jan. 22, 2021, https://www.amazon.com/Mrs-Andersons-Baking-Heavyweight-Commercial/dp/B01LYKQ7DP.

Nordicware 8x8 baking pan, retrieved online, Jan. 22, 2021, https://www.walmart.com/ip/Nordicware-8x8-baking-pan/192545786.

Riverside Paper Co., "Plastic Nesting Tub, 24.5X19X9.5, Blue plastic nesting tub." retrieved from internet, Jan. 22, 2021, http://www.rpconline.com/Plastic-Nesting-Tub_p_11353.html.

Vollrath 61270 Roasting Pan, announced Aug. 2, 2007, retrived from the Internet Jan. 22, 2021, https://www.amazon.com/Baking-Roasting-Pan-6-5-Qt/dp/B000UOJIC2.

* cited by examiner

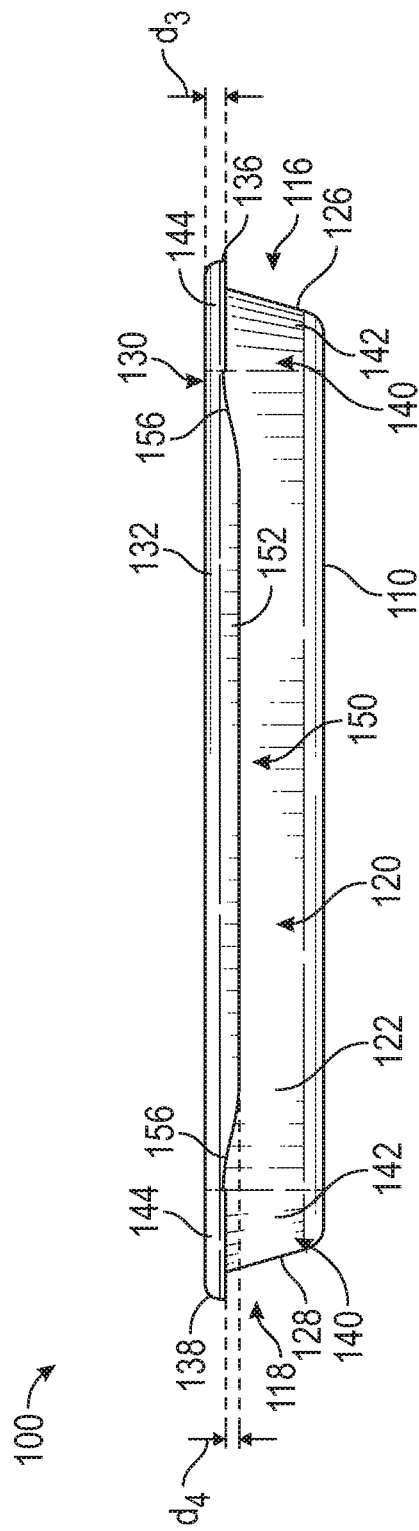
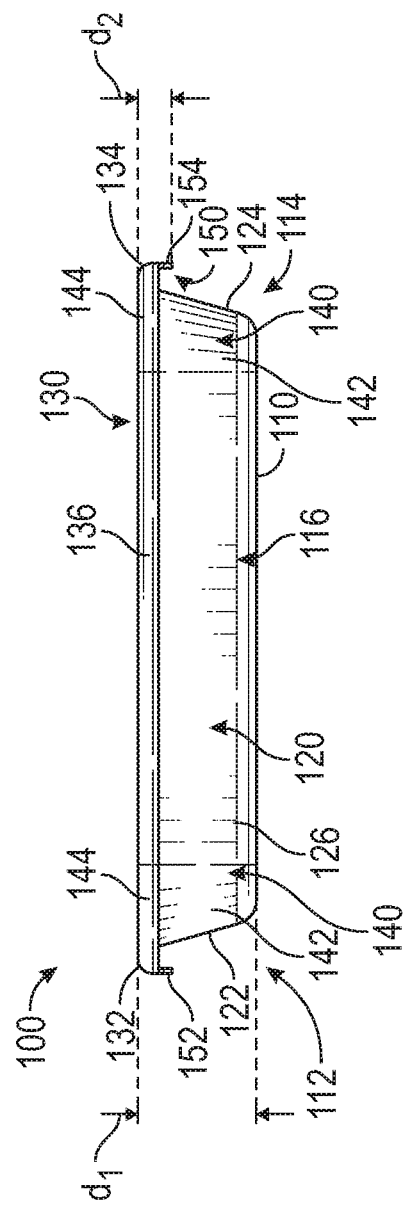

US 11,072,462 B2

PAN WITH INTEGRATED AIR GAP

BACKGROUND

Pans of a common shape are typically stackable or nestable. However, when stacked or nested together, the pans often stick together and, if wet, are unable to completely dry.

SUMMARY

One embodiment relates to a pan. The pan includes a base, a sidewall, and a lip. The sidewall extends from and around a first periphery of the base. The base and the sidewall cooperatively define a cavity. The lip extends from and at least partially along a second periphery of an end of the sidewall opposite the base. The lip has a first portion and a second portion. The first portion of the lip is configured to engage a third portion of a second pan when the pan and the second pan are in a nested arrangement such that engagement between the first portion of the lip and the third portion of the second pan forms an air gap between the pan and the second pan when in the nested arrangement.

Another embodiment relates to a kit. The kit includes a first pan and a second pan. The first pan includes a first base, a first sidewall extending around and from the first base, a first lip extending around and from the first sidewall, and an extended lip extending from only a portion of the first lip. The second pan includes a second base, a second sidewall extending around and from the second base, and a second lip extending around and from the second sidewall. The extended lip of the first pan is configured to engage the second lip of the second pan when the first pan is stacked on top of the second pan. Engagement between the extended lip and the second lip forms an air gap between at least one of (i) the first base and the second base, (ii) the first sidewall and the second sidewall, or (iii) the first lip and the second lip.

Still another embodiment relates to a food vessel. The food vessel includes a body, a lip, and an extended lip. The body has a first peripheral edge. The body defines at least one food cavity. The lip extends from and along the entirety of the first peripheral edge. The lip has a second peripheral edge. The extended lip extends from and along only a portion of the second peripheral edge.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 2 is a side view of the pan of FIG. 1, according to an exemplary embodiment.

FIG. 3 is a front view of the pan of FIG. 1, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a pan includes a lip that extends from and along at least one peripheral edge of the pan (e.g., two edges, three edges, four edges, etc.). The lip is configured to engage a second pan when the pan is stacked or nested therewith, which at least partially causes the formation of an air gap between peripheral walls of the pan and the second pan while stacked or nested. Beneficially, this arrangement may lead to a reduction in stacked or nested pans sticking together when stored and/or may allow air to flow between the stacked or nested pans to improve drying if the pans are wet when stacked or nested (e.g., which inhibits corrosion that may otherwise form with wet, nested pans that are used infrequently, etc.).

Figure 1:
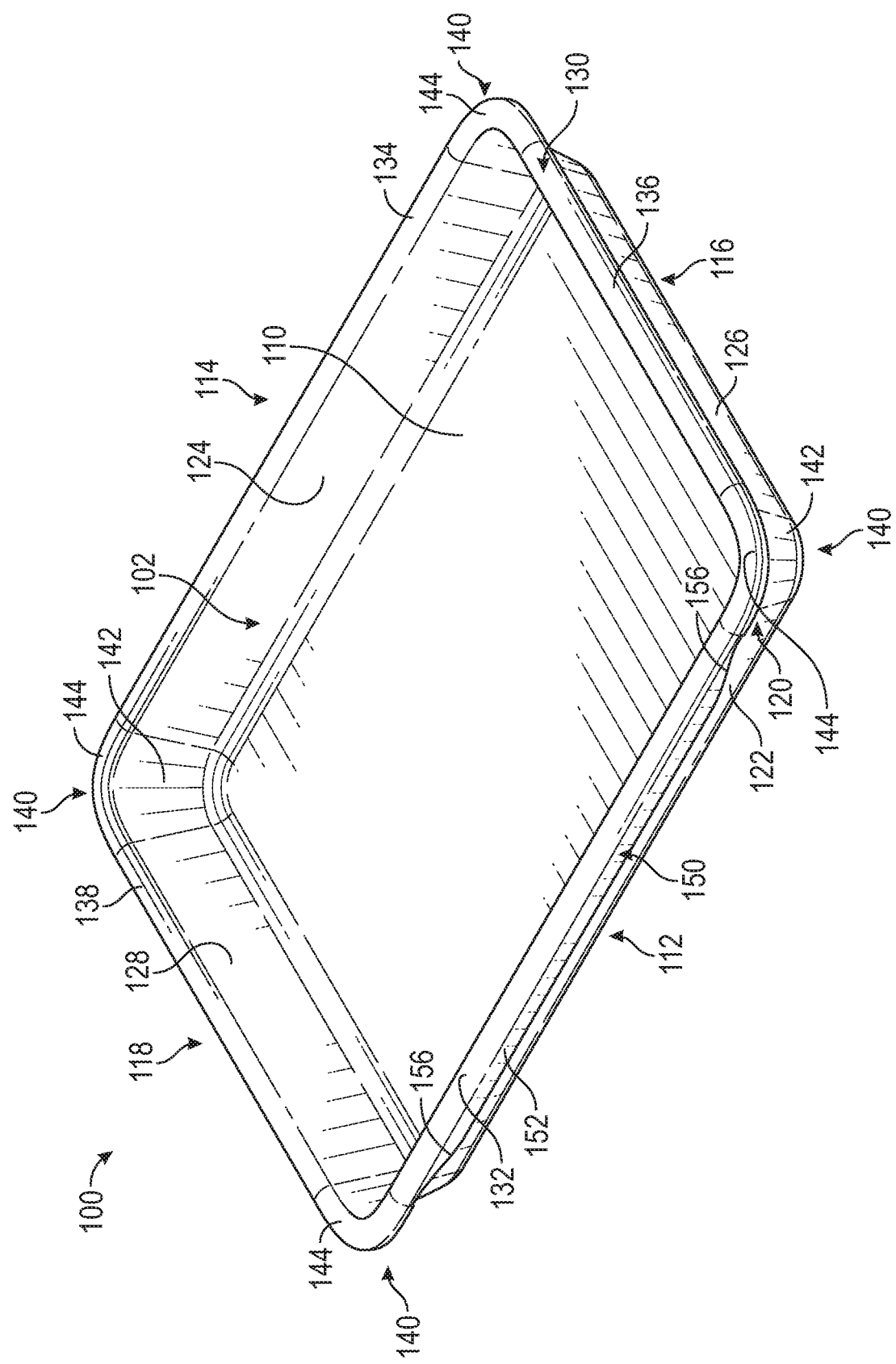
FIG. 1 is a perspective view of a pan, according to an exemplary embodiment.
Figure 4:
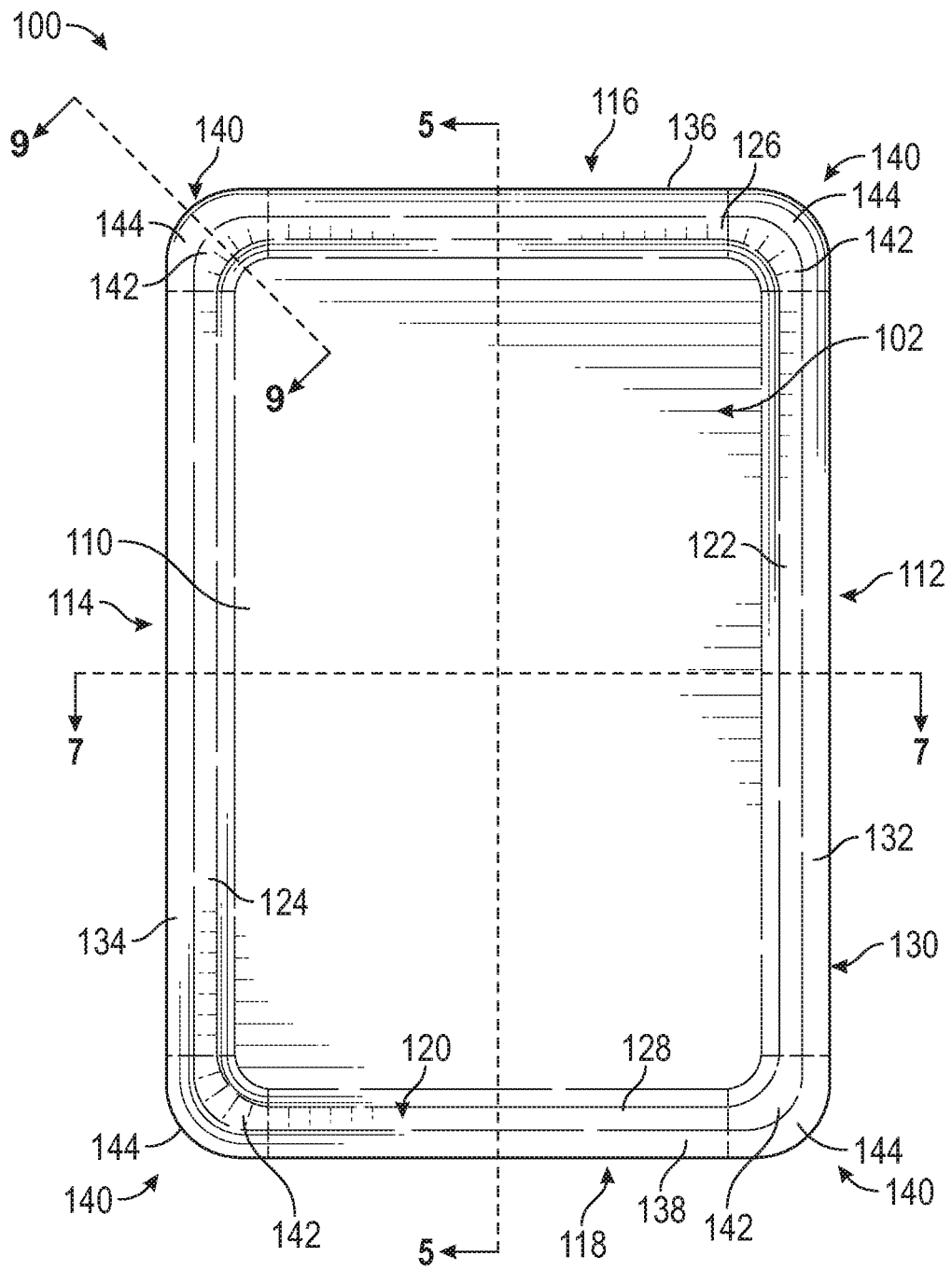
FIG. 4 is a top view of the pan of FIG. 1, according to an exemplary embodiment.
Figure 5:
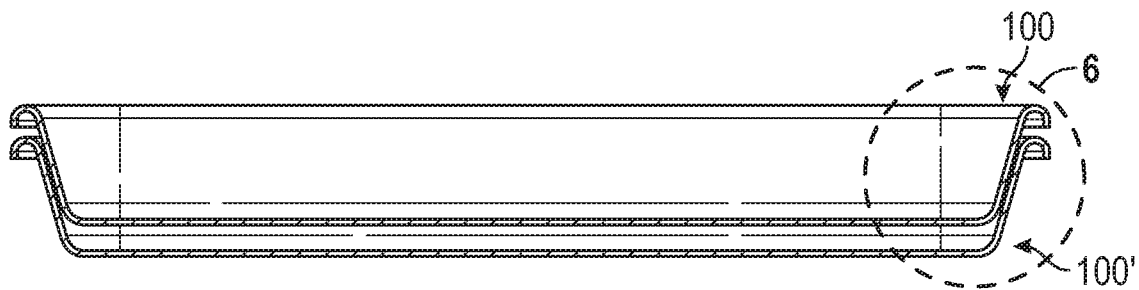
FIG. 5 is a first cross-sectional view of the pan of FIG. 4, according to an exemplary embodiment.

As shown in FIGS. 1-4, a vessel (e.g., a container, a food vessel, a pan, a sheet pan, bakeware, cookware, a food storage container, etc.), shown as pan 100, includes a base portion (e.g., a bottom wall, a base plate, etc.), shown as base 110; a peripheral sidewall, shown as sidewall 120, extending from and around a first periphery of the base 110; and a rim, shown as lip 130, extending from and at least partially along a second periphery (e.g., select portions, the entire periphery, etc.) of an end or edge of the sidewall 120 opposite the base 110. As shown in FIGS. 1 and 4, the base 110 and the sidewall 120 cooperatively define an internal cavity, shown as cavity 102. According to an exemplary embodiment, the pan 100 is designed for use in the preparation (e.g., cooking, baking, etc.), serving, transportation, and/or storage of food product within the cavity 102. However, the pan 100 may be designed for other suitable uses (e.g., to hold various different items, etc.). According to the exemplary embodiment shown in FIGS. 1-4, the base 110 functions as a bottom surface of the pan 100 and the sidewall 120 extends upward from the base 110. In other embodiments, the base 110 functions as a top surface or top wall of the pan 100 and a plurality of individual sidewalls 120 extend downward from the base 110 to define a plurality of cavities 102 (e.g., a muffin pan, etc.). In such embodiments, the lip 130 may extend from and along the periphery of the base 110, rather than the sidewall 120. In some instances, the base 110 and the sidewall(s) 120 may be referred to as a "body" of the pan 100 and, therefore, the lip 130 may extend from and along the body (e.g., the base 110, the sidewall 120, etc.).

As shown in FIGS. 1-4, the base 110 has a first side, shown as left side 112, an opposing second side, shown as right side 114, a first end, shown as front end 116, and an opposing second end, shown as rear end 118. The sidewall 120 includes a first wall portion, shown as left wall 122, extending from the left side 112 of the base 110; a second wall portion, shown as right wall 124, extending from the right side 114 of the base 110; a third wall portion, shown as front wall 126, extending from the front end 116 of the base 110; and a fourth wall portion, shown as rear wall 128, extending from the rear end 118 of the base 110. According to an exemplary embodiment, the sidewall 120 (e.g., the left wall 122, the right wall 124, the front wall 126, the rear wall 128, etc.) extends linearly at an outward sloping angle from the base 110 such that the cavity 102 has a tapered profile. By way of example, the sidewall 120 may be oriented at an angle relative to a vertical plane of between 1 degree and 30 degrees (e.g., 12 degrees, 16 degrees, etc.). In other embodiments, the sidewall 120 has a curved cross-sectional profile (e.g., parabolic, circular, etc.) or still another cross-sectional profile (e.g., wavy, stepped, etc.). According to the exemplary embodiment shown in FIGS. 1 and 4, the base 110 is substantially flat. In other embodiments, the base 110 is at least partially curved (e.g., concave, convex, etc.).

As shown in FIGS. 1-4, the lip 130 includes a first lip portion, shown as left lip 132, extending from the left wall 122; a second lip portion, shown as right lip 134, extending from the right wall 124; a third lip portion, shown as front lip 136, extending from the front wall 126; and a fourth lip portion, shown as rear lip 138, extending from the rear wall 128. As shown in FIGS. 5-9, the lip 130 extends from the sidewall 120 and is shaped (e.g., bends, curls, etc.) such that a free end of the lip 130 extends downward in a direction toward the base 110 and is spaced from the sidewall 120. According to an exemplary embodiment, the lip 130 has a curved (e.g., semi-circular, parabolic, etc.) profile. In other embodiments, the lip 130 has another shaped profile (e.g., a square U-shaped profile, a linearly angled profile, etc.).

As shown in FIGS. 1-4, the pan 100 includes a plurality of corner sections, shown as corners 140, having (i) corner wall portions, shown as corner walls 142, that connect the left wall 122 to the front wall 126, the front wall 126 to the right wall 124, the right wall 124 to the rear wall 128, and the rear wall 128 to the left wall 122 and (ii) corner lip portions, shown as corner lips 144, that connect the left lip 132 to the front lip 136, the front lip 136 to the right lip 134, the right lip 134 to the rear lip 138, and the rear lip 138 to the left lip 132. According to the exemplary embodiment shown in FIGS. 1-4, the corners 140 have a curved profile such that the corners 140 of the pan 100 are curved (e.g., rounded, etc.). In other embodiments, the corners 140 have a linear or straight profile such that the corners 140 of the pan 100 extend linearly between adjacent wall portions of the sidewall 120. In still other embodiments, the pan 100 does not include the corners 140 such that the left wall 122, the right wall 124, the front wall 126, and the rear wall 128, the left lip 132, the right lip 134, the front lip 136, and the rear lip 138 intersect each other at right angles.

According to the exemplary embodiment shown as in FIGS. 1-4, the left wall 122 and the right wall 124 are longer in length than the front wall 126 and the rear wall 128 such that the pan 100 has a rectangular shape. In some embodiments, the left wall 122 and the right wall 124 are shorter in length than the front wall 126 and the rear wall 128. In other embodiments, the left wall 122, the right wall 124, the front wall 126, and the rear wall 128 have the same length such that the pan 100 has a square shape. While shown as a rectangle, it should be understood that the pan 100 (e.g., the base 110, the sidewall 120, etc.) may have another suitable shape. By way of example, the pan 100 may have a circular or ovular shape. By way of another example, the pan 100 may have another four-sided polygon shape (e.g., a rhombus, a trapezoid, a parallelogram, etc.). By way of still another example, the sidewall 120 may have more than four wall portions such that the pan 100 has another shape (e.g., a triangle, a hexagon, an octagon, etc.). By way of yet another example, the pan 100 may have an irregular shape (e.g., a four-leaf clover shape, a Christmas tree shape, etc.).

The pan 100 may be manufactured from various different materials. In some embodiments, the pan 100 is manufactured from a metal or metal alloy. The metal or metal alloy may have a non-stick coating applied thereto. In some embodiments, the pan 100 is manufactured from glass, plastic, or another suitable transparent material. In some embodiments, the pan 100 is manufactured from a ceramic material (e.g., porcelain, clay, etc.). The pan 100 may also have various different dimensions and sizes for various different applications. By way of example, for a rectangular shaped pan, the pan 100 may have dimensions of 8 inches ("in")×4 in (e.g., a loaf pan), 9 in×6 in (e.g., an eighth-size sheet pan), 9 in×13 in (e.g., a quarter-size sheet pan), 18 in×13 in (e.g., a half-size sheet pan), 26 in×18 in (e.g., a full-size sheet pan), etc. By way of another example, for a square shaped pan, the pan 100 may have dimensions of 6 in×6 in, 8 in×8 in, 9 in×9 in, 10 in×10 in, etc. By way of still another example, for a circular shaped pan, the pan 100 may have a diameter of 6 in, 8 in, 10 in, 12 in, 14 in, 16 in, 18 in, etc. As shown in FIG. 3, the pan 100 has a first dimension, shown as depth $d_1$, which includes the height of the base 110, the sidewall 120, and the lip 130. The depth $d_1$ may vary depending on the application of the pan 100. By way of example, the depth $d_1$ may range from 1 in (e.g., for a sheet pan, etc.) up to 8 in or more (e.g., for a food well pan, etc.).

As shown FIGS. 1-3, the lip 130 includes an extended lip portion, shown as extended lip 150, having one or more extended lip portions extending from and at least partially along a third periphery of the lip 130. According to the exemplary embodiment shown in FIGS. 1-3, the extended lip 150 includes (i) a first extended lip portion, shown as left extended lip portion 152, extending from and at least partially along the length of the left lip 132 and (ii) a second extended lip portion, shown as right extended lip portion 154, extending from and at least partially along the length of the right lip 134. In some embodiments, the extended lip 150 additionally or alternatively includes extended lip portions that extend from and at least partially along the length of front lip 136 and/or the rear lip 138. In some embodiments, the extended lip 150 includes extended lip portions that extend from and at least partially along the left lip 132 (i.e., the left extended lip portion 152), the right lip 134 (i.e., the right extended lip portion 154), the front lip 136, and the rear lip 138 (but not the corner lips 144). In some embodiments, the extended lip 150 additionally or alternatively includes extended lip portions that extend from two or more of the corner lips 144 (e.g., all four of the corner lips 144, opposing corner lips 144, etc.). Accordingly, the extended lip 150 may extend from any combination of (i) the left lip 132, (ii) the right lip 134, (iii) the front lip 136, (iv) the rear lip 138, and (v) one or more of the corner lips 144 so long as one or more portions of the lip 130 does not include the extended lip 150 (e.g., to maintain an entrance/exit for airflow when nested with another pan, etc.).

As shown in FIGS. 1 and 2, the left extended lip portion 152 extends along substantially the entire length of the left lip 132, but ends at and does not extend along the corner lips 144. According to an exemplary embodiment, the right extended lip portion 154 similarly extends along the entire length of the right lip 134, but ends at and does not extend along the corner lips 144. In other embodiments, the left extended lip portion 152 and/or the right extended lip portion 154 extends only along a portion (e.g., one-third, one-half, etc.) of the left lip 132 and the right lip 134, respectively. As shown in FIG. 3, the lip 130 and the extended lip 150 have a second dimension (e.g., a first height, etc.), shown as dimension $d_2$. As shown in FIG. 2, the lip 130 has a third dimension (e.g., a second height, etc.), shown as dimension $d_3$, and the extended lip 150 has a fourth dimension (e.g., a third height, etc.), shown as dimension $d_4$ (i.e., the dimension $d_3$ and the dimension $d_4$ make up the dimension $d_2$).

As shown in FIGS. 1 and 2, opposing ends of the left extended lip portion 152 proximate opposing corner lips 144 have curved portions, shown as curved profiles 156, that gradually change the dimensions of the left lip 132 from the dimension $d_2$ to the dimension $d_3$. According to an exemplary embodiment, opposing ends of the right extended lip portion 154 proximate opposing corner lips 144 similarly have the curved profiles 156 that gradually change the dimensions of the right lip 134 from the dimension $d_2$ to the dimension $d_3$. In other embodiments, the left extended lip portion 152 and/or the right extended lip portion 154 do not include the curved profiles 156. Rather, the curved profiles 156 may be replaced with linearly angled profiles, right angle profiles, and/or other suitable profiles.

In one embodiment, the pan 100 is a 9 in×13 in sheet pan where the depth $d_1$ is about 1.13 in, the dimension $d_2$ is about 0.43 in, the dimension $d_3$ is about 0.19 in, and the dimension $d_4$ is about 0.24 in. In another embodiment, the pan 100 is a 9 in×6 in sheet pan where the depth $d_1$ is about 1.08 in, the dimension $d_2$ is about 0.31 in, the dimension $d_3$ is about 0.17 in, and the dimension $d_4$ is about 0.14 in. As used in the two above example embodiments, "about" means±0.06 in. It should be understood that the two above example embodiments are for illustration purposes and should not be regarded as limiting. Further, it should be understood that the depth $d_1$, the dimension $d_2$, the dimension $d_3$, and/or the dimension $d_4$ may be any suitable dimension that facilitates providing the air gaps described in more detail herein with respect to FIGS. 5-9.

The lip 130 and/or the extended lip 150 may have various other shapes and/or sizes than depicted in the Figures or described herein. The lip 130 and/or the extended lip 150 may have a variety of uses or functions including, but not limited to, (i) being used as a handle for carrying and/or otherwise repositioning the pan 100, (ii) securing the pan 100 to a food well, food rack, or other food holding or temperature regulating unit, (iii) improved stackability or nestability (as is described in more detail herein with respect to FIGS. 5-9), and/or (iv) still other suitable uses. For example, the dimensional differences between the lip 130 and the extended lip 150 may allow a person to grasp the pan 100 to lift and separate the pan 100 from one or more other pans (see, e.g., distance $d_8$ and lip air gap 206).

Figure 6:
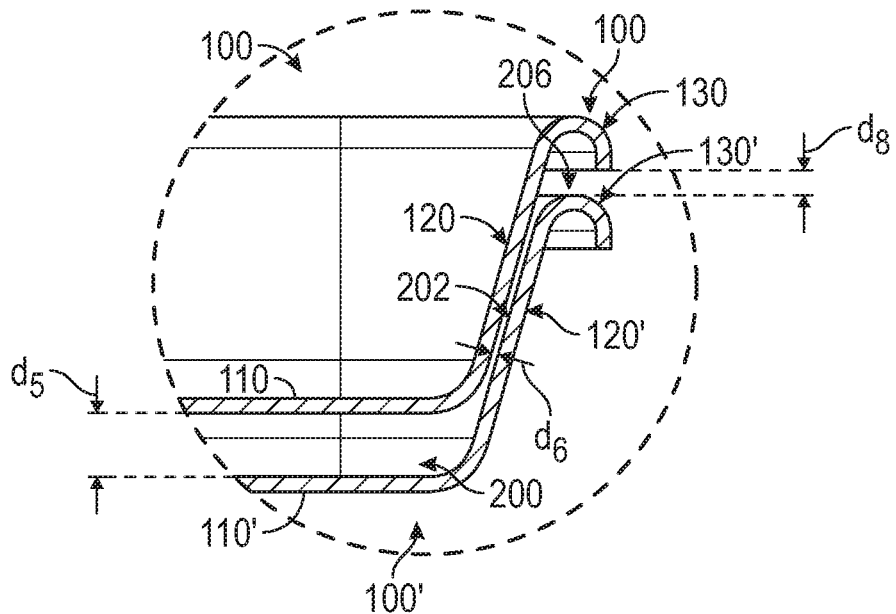
FIG. 6 is a detailed view of the first cross-sectional view of the pan of FIG. 5, according to an exemplary embodiment.
Figure 7:
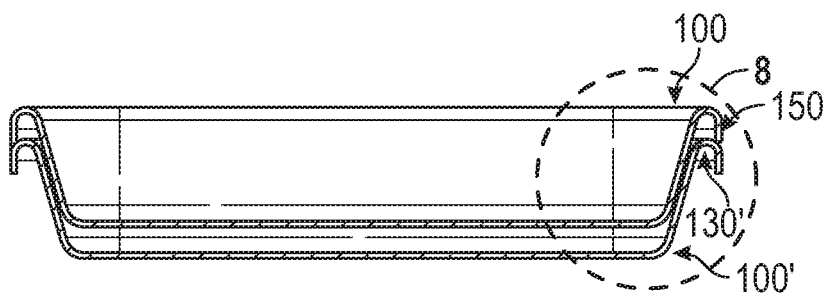
FIG. 7 is a second cross-sectional view of the pan of FIG. 4, according to an exemplary embodiment.
Figure 8:
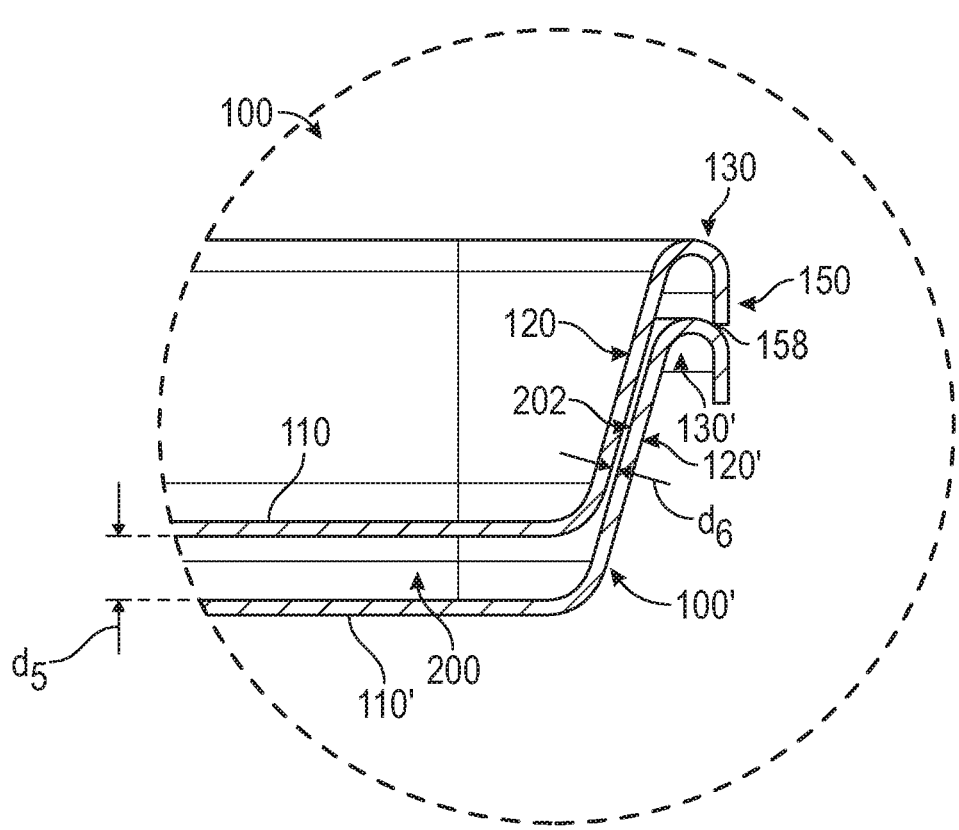
FIG. 8 is a detailed view of the second cross-sectional view of the pan of FIG. 7, according to an exemplary embodiment.
Figure 9:
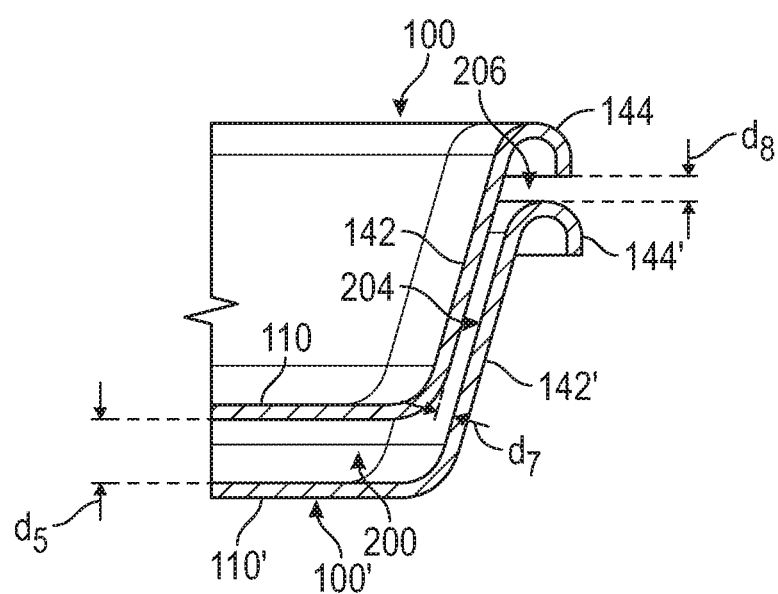
FIG. 9 is a third cross-sectional view of the pan of FIG. 4, according to an exemplary embodiment.

As shown in FIGS. 5-9, the pan 100 is configured (e.g., shaped, sized, etc.) to be stackable or nestable with a second, identical pan, shown as pan 100'. As shown in FIGS. 7 and 8, the extended lip 150 of the pan 100 is configured (e.g., positioned, shaped, sized, etc.) to engage with the lip 130' of the pan 100' at a point of contact, shown as engagement point 158. According to an exemplary embodiment, the dimensions of the pan 100 and the pan 100' (e.g., the depth $d_1$, the dimension $d_2$, the dimension $d_3$, the dimension $d_4$, etc.) are selected (e.g., sized, shaped, positioned, etc.) such that the engagement between the extended lip 150 and the lip 130' along the engagement point 158 forms various air gaps between the pan 100 and the pan 100'. As shown in FIGS. 6, 8, and 9, the engagement between the extended lip 150 and the lip 130' (i) spaces the base 110 of the pan 100 and the base 110' of the pan 100' a first distance apart, shown as distance $d_5$, thereby forming a first air gap, shown as base air gap 200, therebetween; (ii) spaces the sidewall 120 (e.g., the left wall 122, the right wall 124, the front wall 126, the rear wall 128, etc.) of the pan 100 and the sidewall 120' of the pan 100' a second distance apart, shown as distance $d_6$, thereby forming a second air gap, shown as sidewall air gap 202, therebetween; (iii) spaces the corner walls 142 of the pan 100 and the corner walls 142' of the pan 100' a third distance apart, shown as distance $d_7$, thereby forming a third air gap, shown as corner air gap 204; and (iv) spaces (a) portions of the lip 130 (e.g., the front lip 136, the rear lip 138, etc.) and the corner lips 144 of the pan 100 and (b) portions of the lip 130' and the corner lips 144' of the pan 100', respectively, a fourth distance apart, shown as distance $d_8$, thereby forming a fourth air gap (e.g., an air flow entrance/exit, etc.), shown as lip air gap 206, therebetween.

In some embodiments, as shown in FIGS. 6, 8, and 9, the distance $d_6$ of the sidewall air gap 202 and the distance $d_7$ of the corner air gap 204 are different. In some embodiments, the distance $d_6$ of the sidewall air gap 202 and the distance $d_7$ of the corner air gap 204 are the same or substantially the same. In one embodiment, the distance $d_5$ of the base air gap 200 is about 0.337 in, the distance $d_6$ of the sidewall air gap 202 is about 0.030 in, and the distance $d_7$ of the corner gap 204 is about 0.030 in. In another embodiment, the distance $d_5$ of the base air gap 200 is about 0.231 in, the distance $d_6$ of the sidewall air gap 202 is about 0.030 in, and the distance $d_7$ of the corner air gap 204 is about 0.060 in. As used in the two above example embodiments, "about" means±0.031 in. It should be understood that the two above example embodiments are for illustration purposes and should not be regarded as limiting. Further, it should be understood that the distance $d_5$, the distance $d_6$, the distance $d_7$, and/or the distance $d_8$ may vary based on the depth $d_1$, the dimension $d_2$, the dimension $d_3$, and/or the dimension $d_4$ selected for the pan 100.

According to an exemplary embodiment, the formation of the base air gap 200, the sidewall air gap 202, the corner air gap 204, and the lip air gap 206 between the pan 100 and the pan 100' when in stacked or nested arrangement provides various advantages relative to traditional pans when stacked or nested. Specifically, the base air gap 200, the sidewall air gap 202, the corner air gap 204, and the lip air gap 206 prevent an interference fit between the sidewall 120 and the sidewall 120' such that the pan 100 and the pan 100' do not stick together when stacked or nested and are easily separable from each other. In some embodiments, the pan 100 and the pan 100' include a detent/retainer feature that secures (e.g., with a snap fit, etc.) the pan 100 and the pan 100' together to prevent inadvertent disengagement therebetween (e.g., to provide for more secure transport of multiple pans at one time, etc.). Further, the base air gap 200, the sidewall air gap 202, the corner air gap 204, and the lip air gap 206 provide an air flow path between the pan 100 and the pan 100' that permits continued drying, if wet when stacked or nested together (e.g., which inhibits corrosion that may otherwise form with wet, nested pans, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the pan 100 as shown in the various exemplary embodiments is illustrative only. Additionally, any element disclosed in one embodiment may be incorporated or utilized with any other embodiment disclosed herein Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A pan comprising:
a base;
a sidewall extending from and around a first periphery of the base, the base and the sidewall cooperatively defining a cavity, the sidewall including a first wall portion, a second wall portion positioned opposite the first wall portion, a third wall portion coupling first ends of the first wall portion and the second wall portion together, and a fourth wall portion positioned opposite the third wall portion and coupling opposing second ends of the first wall portion and the second wall portion together;
corner portions having corner walls connecting the first wall portion, the second wall portion, the third wall portion, and the fourth wall portion together;
a lip extending from and at least partially along a second periphery of an end of the sidewall opposite the base, wherein the lip extends along the first wall portion, the second wall portion, the third wall portion, and the fourth wall portion; and
an extended lip extending from and only partially along a third periphery of the lip;
wherein the extended lip extends from the lip along the first wall portion, the second wall portion, the third wall portion, and the fourth wall portion, but not the corner walls; and
wherein the extended lip is configured to engage a second lip of a second pan when the pan and the second pan are in a nested arrangement such that engagement between the extended lip and the second lip of the second pan forms an air gap between the pan and the second pan when in the nested arrangement.

2. The pan of claim 1, wherein the sidewall extends linearly outward at an angle from the base such that the cavity has a tapered profile.

3. The pan of claim 1, wherein the sidewall has a curved profile.

4. The pan of claim 1, wherein the lip is shaped such that a free end of the lip extends downward in a direction toward the base.

5. The pan of claim 1, wherein the lip extends along the entirety of the second periphery of the sidewall.

6. The pan of claim 5, wherein the lip extends along the corner portions.

7. The pan of claim 1, wherein the air gap includes a lip air gap positioned between the lip and the second lip where the extended lip is not positioned.

8. The pan of claim 1, wherein the corner walls (i) have a curved profile such that the corner portions are curved or (ii) have a linear profile such that the corner portions are not curved.

9. A food vessel comprising:
a body having a first peripheral edge, the body defining at least one food cavity;
a lip extending from and along the entirety of the first peripheral edge, the lip including a second peripheral edge having a first edge, a second edge opposite the first edge, a third edge, a fourth edge opposite the third edge, and corners positioned between the first edge, the second edge, the third edge, and the fourth edge; and
an extended lip extending from and along a majority of the first edge and the second edge of the second peripheral edge, but not at the corners.

10. The food vessel of claim 9, wherein the extended lip is positioned to engage a second lip of a second food vessel when the food vessel and the second food vessel are in a nested arrangement, wherein engagement between the extended lip and the second lip forms an airgap between the food vessel and the second food vessel when in the nested arrangement.

11. The food vessel of claim 9, wherein the first edge and the second edge are longer than the third edge and the fourth edge.

12. The food vessel of claim 9, wherein the first edge and the second edge are shorter than the third edge and the fourth edge.

13. The food vessel of claim 9, wherein the corners are curved.

14. The food vessel of claim 9, wherein the food vessel is a sheet pan, a muffin pan, a loaf pan, a well pan, or a pan with a depth ranging between one inch and eight inches.

15. A food vessel comprising:
a body having a first peripheral edge, the body defining at least one food cavity;

a lip extending from and along the entirety of the first peripheral edge, the lip including a second peripheral edge having a first edge, a second edge opposite the first edge, a third edge, a fourth edge opposite the third edge, and corners positioned between the first edge, the second edge, the third edge, and the fourth edge; and an extended lip extending from and along at least a portion of each of the first edge, the second edge, the third edge, and the fourth edge of the second peripheral edge, but not at the corners.

16. The food vessel of claim 15, wherein the extended lip extends from and along a majority of each of the first edge, the second edge, the third edge, and the fourth edge.

\* \* \* \* \*